United States Patent [19]

Baranowski et al.

[11] Patent Number: 5,613,229
[45] Date of Patent: Mar. 18, 1997

[54] VOLTAGE AND CURRENT MODE POWER REGULATOR

[75] Inventors: Robert Baranowski; William P. Alberth, Jr., both of Crystal Lake; Donald J. Millar, Libertyville, all of Ill.

[73] Assignee: Motorola, Inc., Schaumburg, Ill.

[21] Appl. No.: 624,046

[22] Filed: Mar. 25, 1996

Related U.S. Application Data

[63] Continuation of Ser. No. 443,244, May 17, 1995, abandoned.

[51] Int. Cl.$^6$ .............................. H01Q 11/12; H04B 1/04
[52] U.S. Cl. ................... 455/127; 455/115; 455/89; 455/95; 323/285; 320/6
[58] Field of Search .................. 455/89, 95, 115, 455/127; 307/9.1, 10.1, 10.8, 64, 66, 85, 86, 87, 21, 23, 24, 31; 323/282, 285; 379/61; 320/5, 6, 14, 39, 40

[56] References Cited

U.S. PATENT DOCUMENTS

| | | | |
|---|---|---|---|
| 3,737,758 | 6/1973 | Allington | 363/86 |
| 3,786,344 | 1/1974 | Davis et al. | 323/267 |
| 4,177,389 | 12/1979 | Schott | 307/64 |
| 4,468,597 | 8/1984 | Baumard et al. | 388/815 |
| 4,566,052 | 1/1986 | Kammiller | 361/18 |
| 4,649,464 | 5/1987 | Shono | 363/21 |
| 4,673,861 | 6/1987 | Dubovsky et al. | 455/89 |
| 5,371,453 | 12/1994 | Fernandez | 320/5 |
| 5,392,462 | 2/1995 | Komaki | 379/61 |

FOREIGN PATENT DOCUMENTS

673100A1 3/1994 European Pat. Off. .

OTHER PUBLICATIONS

MAX747 product brochure, High–Efficiency PWM, Step–Down P–Channel DC–DC Controller, revision Aug. 1993, Maxim Integrated Products; pp. 4–135 to 4–146.

Primary Examiner—Andrew Faile
Assistant Examiner—Marsha D. Banks-Harold
Attorney, Agent, or Firm—Randall S. Vaas

[57] ABSTRACT

A power regulator (220) includes a power source output (303) for coupling to a power source. A switching circuit (345) controls the supply of power from the power source output to an energy storage circuit (334). An output (305) of the energy storage circuit has a controlled current in a current regulator mode. The output of the energy storage circuit has a substantially constant voltage in a voltage regulator mode.

28 Claims, 3 Drawing Sheets

VOLTAGE AND CURRENT MODE POWER REGULATOR

This is a continuation of application Ser. No. 08/443,244, filed May 17, 1995 and now abandoned.

FIELD OF THE INVENTION

The present invention pertains to power regulators, and more particularly to voltage and current regulators.

BACKGROUND OF THE INVENTION

Voltage regulators and current regulators are well-known power regulators. Current regulators produce a regulated output having a predetermined current level, although the voltage level of the output may vary considerably while generating this controlled current level. Voltage regulators generate an output having a predetermined voltage level, although the current level of the output is permitted to fluctuate.

A variety of electronic devices employ both voltage and current regulators. For example, radio telephones include a voltage regulator to control the voltage supplied to electrical components, such as power amplifiers. For power amplifiers, the stability of the voltage supply is important as variations in the supply voltage level will vary the transmitted signal level, thereby introducing noise. It is therefor desirable to supply the power amplifier with a stable voltage level. Radio telephones may also include a current regulator to control the charging current applied to a rechargeable battery from an external source. The performance of the battery charger is dependent upon the charging current, so the charging current is carefully controlled during charging.

Electronic devices employing both current and voltage regulators use separate switching circuits for the current regulator and the voltage regulator. Although these separate regulators are effective to control their respective outputs to have a substantially constant output level, each switching circuit is relatively expensive and utilizes a substantial surface area of a printed circuit board (PCB) to which they are mounted. For small devices, the relatively large circuit board surface area required by the switching circuits can be a substantial hindrance to designers attempting to further reduce the size thereof.

Accordingly, it is desirable to provide voltage and current regulators in a smaller, less costly manner, while maintaining circuit performance.

DETAILED DESCRIPTION OF THE DRAWINGS

The present invention is embodied in a voltage regulator and a current regulator that share a switching circuit. The shared switching circuit is used to control both the voltage level of the voltage regulator output and the current level of the current regulator output. The common switching circuit eliminates one of the switching circuits used previously hereto, thereby reducing the total cost, and the circuit board surface area, required to implement both switching circuits in a single device. This allows the device to be made smaller, without detrimentally affecting its performance.

Figure 1:
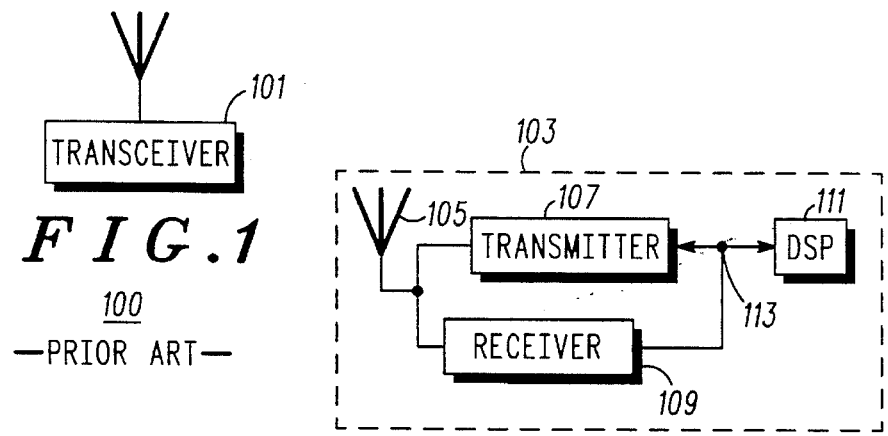
FIG. 1 is a circuit schematic in block diagram form illustrating a conventional radio telephone system.

The invention can be advantageously employed in a radio telephone 103 utilized in an existing radio telephone system 100 illustrated in FIG. 1. In radio telephone system 100, there is a fixed site transceiver 101 which communicates with portable and mobile radio telephones contained within its geographic coverage area via radio frequency (RF) signals. One such radio telephone 103 is a portable radio telephone. Although the invention is illustrated in a portable radio telephone, it can be advantageously employed in other devices, such as mobile telephones, personal digital communicators, two-way radios, computers, and the like.

Radio telephone 103 includes a transmitter 107 coupled to an antenna 105. Antenna 105 is used to transmit and receive radio frequency signals when communicating with fixed site transceiver 101. Upon receiving signals, antenna 105 converts the signal's energy into electrical signals which are communicated to receiver 109. Receiver 109 demodulates the electrical signals and converts them into data signals usable by the remainder of the circuitry in radio telephone 103, represented herein by the digital signal processor (DSP) 111.

Figure 2:
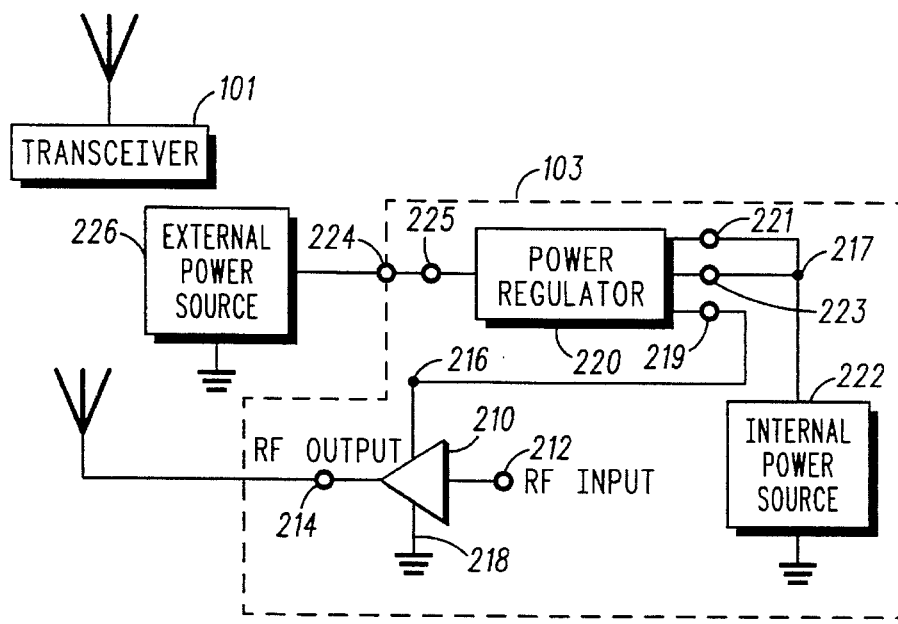
FIG. 2 is a circuit schematic in block diagram form illustrating a portion of the transmitter for the radio telephone for use in the system of FIG. 1.

To transmit radio frequency signals, the DSP 111 feeds information to transmitter 107 via bi-directional signal line 113. This information includes the information which is desired to be transmitted and control information for transmitter 107. Transmitter 107 converts the data into electrical signals and amplifies these signals to the appropriate power level using a power amplifier 210 (FIG. 2). The antenna 105 is responsive to the electrical energy from the power amplifier to radiate radio frequency signals into the air for reception by fixed site transceiver 101 of the base station.

The power amplifier 210 (FIG. 2) and its associated controllers are located in transmitter 107. The function of the power amplifier 210 is to amplify input RF signals, which contain voice or data, to a power level that facilitates transmission to the fixed site transceiver 101. The power amplifier may be implemented using any suitable commercially available power amplifier. A supply voltage for the power amplifier is coupled across positive supply rail 216 and ground supply rail 218. Ground supply rail 218 is connected to ground. Positive supply rail 216 is connected to a voltage regulator mode output 219 of power regulator 220.

The power regulator 220 has an internal power source input 221 connected to terminal 217, which is the positive terminal of internal power source 222. The internal power source 222 is a battery in the illustrated embodiment, and may be implemented using any suitable conventional electrochemical cell. It is envisioned that the internal power source 222 is either mounted within a housing (not shown) shared with transmitter 107 and receiver 109, or provided in a separate housing (not shown) attached to the housing (not shown) for transmitter 107 and receiver 109 as is commonly found in portable radio telephones. The internal power source 222 supplies power to the power regulator 220 when the radio telephone 103 is self-powered.

The power regulator 220 includes a voltage regulator mode output 219. The power regulator supplies a substantially constant regulated voltage level at voltage regulator mode output 219 in the voltage regulator mode.

Power regulator 220 includes an external power source input 225 connected to a connector 224. Connector 224 is for connection to an external power source 226. The external power source is a vehicle or other battery, an AC to DC converter connected to a conventional AC power source, such as a wall outlet, or the like.

The power regulator 220 (FIG. 2) also includes a current regulator mode output 223 coupled to the internal power source 222. During the current regulator mode of operation, the power regulator 220 supplies a controlled current at current regulator mode output 223.

Figure 3:
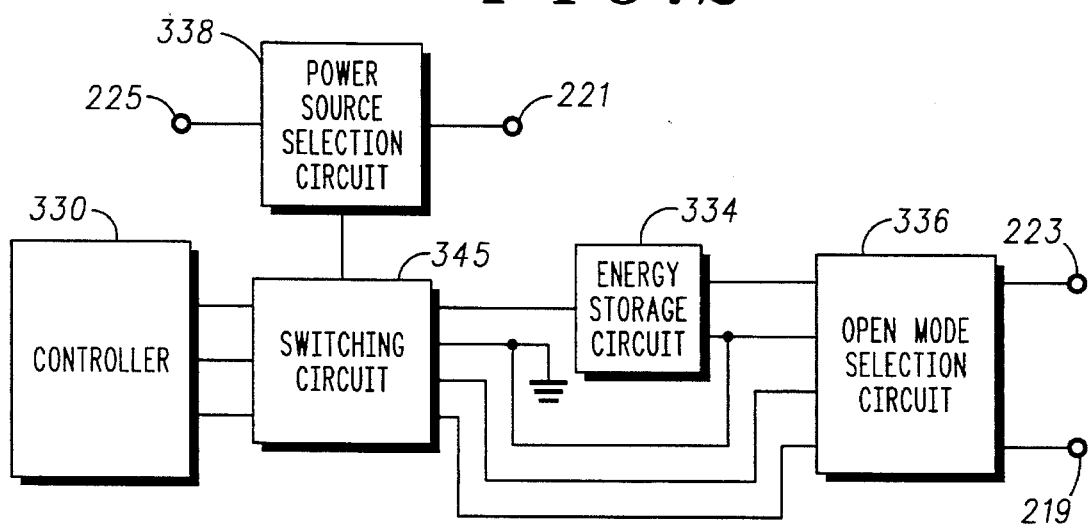
FIG. 3 is a circuit schematic in block diagram form illustrating a power regulator for use in the circuit of FIG. 2.
Figure 4:
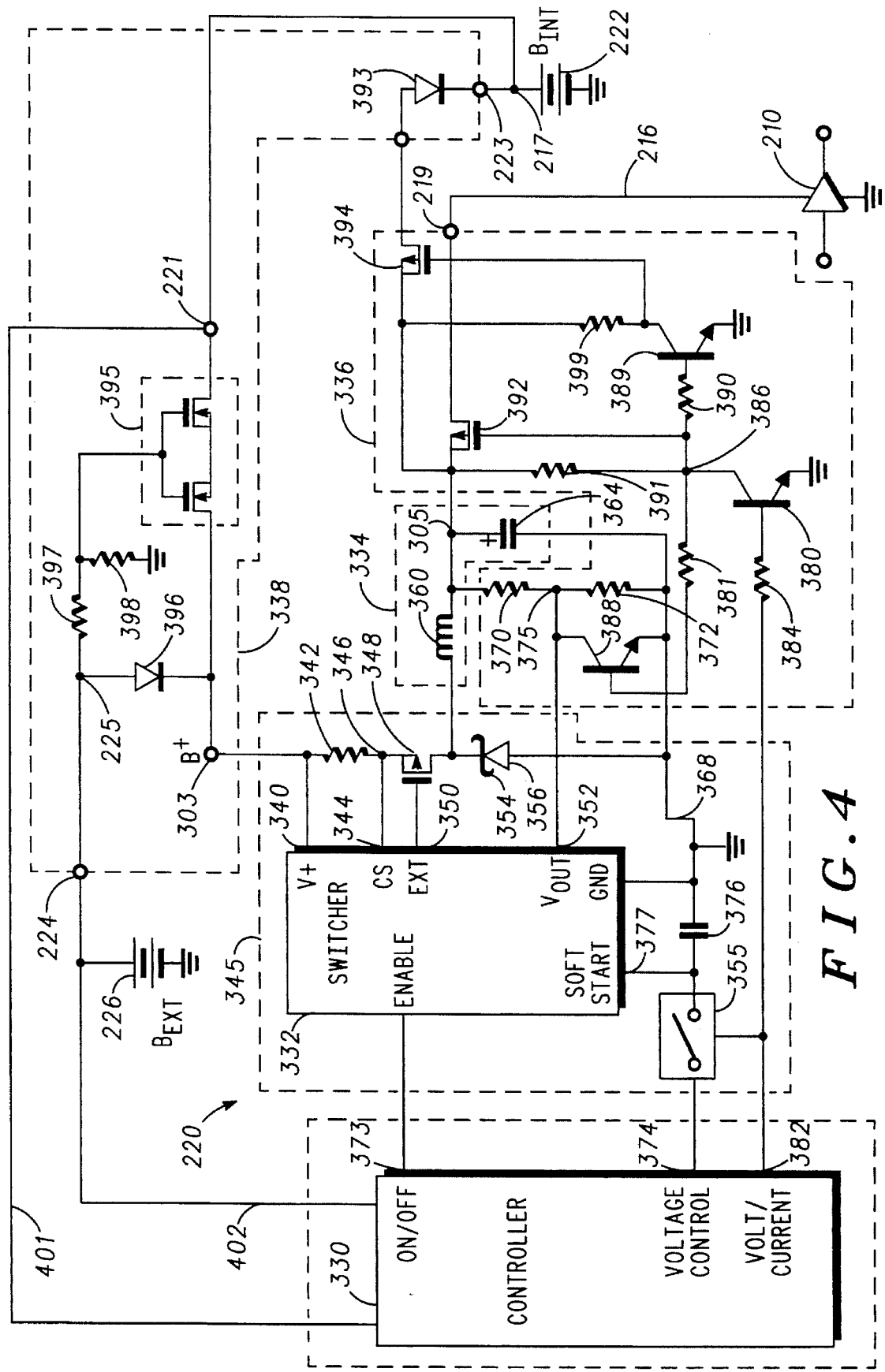
FIG. 4 is a circuit schematic, partially in block diagram form, illustrating the power regulator of FIG. 3.
Figure 5:
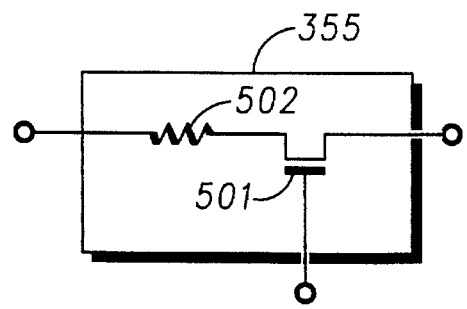
FIG. 5 is a circuit schematic illustrating a switch for the power regulator according to FIG. 4.

The power regulator 220 will now be described with reference to FIGS. 3–5. Power regulator 220 generally includes: a controller 330 (FIG. 3); a switching circuit 345; an energy storage circuit 334; an output mode selection circuit 336; and a power source selection circuit 338. The power source selection circuit 338 selects the internal power source input 221 or the external power source input 225 as the power supply to supply energy to the switching circuit 345. The switching circuit selectively supplies energy to energy storage circuit 334. Energy storage circuit 334 smoothes the signal applied thereto to generate an output signal. The output mode selection circuit 336 changes the power regulator 220 between a voltage regulator mode and a current regulator mode, and selects the current regulator mode output 223 or voltage regulator mode output 219 as the active output. Controller 330 controls the operation of the switching circuit 345 and the output mode selection circuit 336.

The switching circuit 345 includes a switch driver, or switcher, 332 (FIG. 4) and a supply switch 348. The illustrated switch driver 332 is an output voltage regulation circuit. In a reduction to practice, the switch driver 332 is implemented using an integrated circuit number MAX747, which is a pulse-width-modulator (PWM) commercially available from MAXIM. However, other integrated circuits could be used to implement the switch driver, or the switch driver could be assembled from discrete components.

The MAX747 has a fixed frequency, variable pulse width, output. The fixed frequency output is desirable because the switching frequency is readily removed from the output to provide a stable output voltage. It is particularly important to produce a substantially ripple-free voltage for the power amplifier 210 as this amplifier is sensitive to voltage variations and requires a constant voltage for proper performance in the radio telephone. A fixed switching frequency is readily removed using a filter which attenuates signals at the switching circuit output that have the same frequency as the frequency of the switch driver. If a variable frequency switching circuit is employed, current mode operation will be improved. However, the switching frequency ripple will be substantially harder to remove because the frequency will change. Thus, by utilizing a constant frequency switching circuit, the larger switching frequency spectrum of the variable frequency switch driver is avoided.

Switch driver 332 has an ENABLE input connected to an ON/OFF output 373 of a controller 330. Switch driver 332 is turned ON and OFF by changing the level of the signal on the controller ON/OFF output 373. The switch driver also includes a SOFT START input 377 connected to a soft start switch 355 and to soft start capacitor 376. Soft start switch 355 selectively connects VOLTAGE CONTROL output 374 of controller 330 to the SOFT START input 377 and to soft start capacitor 376. Soft start switch 355 is implemented using any suitable switch, such as an analog soft start MOSFET element 501 and a soft start switch resistor 502 illustrated in FIG. 5.

Switch driver 332 (FIG. 4) includes a supply voltage input 340 connected to a power source output 303. Power source output 303 is coupled to power source selection circuit 338 to receive power for the switch driver from the internal power source 222 or the external power source 226. A first resistor 342 is connected between the supply voltage input 340 and the current sense input 344 of switch driver 332. The current sense input is connected to the source 346 of supply switch 348. The gate of supply switch 348 is the switch control input, and it is connected to the gate drive output, or control output, 350 of switch driver 332. The illustrated supply switch 348 is implemented using a P-channel MOSFET element. However, the switch can be implemented using bipolar transistors, or other conventional switching components. The drain of supply switch 348 is connected to the cathode 354 of a schottky diode 356. The anode of schottky diode 356 is connected to ground. The drain of supply switch 348 is also connected an energy storage circuit input 351. Supply switch 348 supplies energy to energy storage circuit input 351 under the control of the switch driver 332 control output 350.

The energy storage circuit input 351 is connected to one terminal of an inductor 360 in the energy storage circuit 334. The other terminal of inductor 360 is connected to the anode of an energy storage capacitor 364. The cathode of energy storage capacitor 364 is connected to ground. The control output 350, also labeled EXT, of switch driver 332 controls the ON/OFF state of supply switch 348 to regulate the amount of energy supplied to the energy storage circuit 334, including inductor 360 and energy storage capacitor 364.

The voltage sense input, $V_{OUT}$ or 352, of switch driver 332 is connected to a voltage divider junction 375 of a voltage divider including a first voltage divider resistor 370 and a second voltage divider resistor 372. This voltage divider is connected in series across energy storage capacitor 364, and provides a voltage proportional to the output voltage to the voltage sense input 352 of switch driver 332.

In addition to the output voltage sense input 352, switch driver 332 includes a current sense input CS, or 344. The switch driver includes an internal comparator which compares the signal on the signal level on the current sense input 344 to the signal on the SOFT START input 377. By changing the level on the SOFT START input, the controller 330 changes the output current level in a current regulation mode. Switch driver 332 also includes an internal comparator that compares the voltage sense input $V_{OUT}$ to a fixed, predetermined level, to generate a substantially fixed output voltage in a voltage regulator mode. An oscillator within the switching circuit generates timing pulses at a fixed frequency, such that the output frequency is constant.

The MAXIM MAX747 integrated circuit has an FB input (not shown) that is connected to ground for the illustrated embodiment. This causes the integrated circuit to look at the output voltage sense input 352 as a voltage feedback input.

In operation, when switching circuit 345 is enabled at the beginning of each internal timing pulse, the signal at the control output 350 of switch driver 332 connected to the control input of supply switch 348 goes low, turning the supply switch ON. The control output 350 remains low until the signal level on the current sense input 344 exceeds the signal level on the SOFT START input 377, or the voltage level on the output voltage sense input 352 rises above the fixed, predetermined level. The switch driver control output 350 then goes high until the start of the next pulse.

The current sense input 344, soft start capacitor 376, and the SOFT START input 377 provide a soft start control for switching circuit 345. The switch driver outputs a high logic level signal at control output 350, which disables supply switch 348, when the CS input signal level exceeds the SOFT START input signal level. Soft start capacitor 376 charges up slowly from current output from SOFT START input 377 when the switch driver is turned on, such that the current sense input starts at a low level and gradually rises. Consequently, the current sense input 344 typically exceeds the SOFT START input quickly after the pulse starts when the switch driver is initially turned on. However, as the switch driver remains running, supply switch 348 will be held open longer due to the rising signal level across soft start capacitor 376. This helps prevent spiking when the switch driver 332 is started.

The output mode selection circuit 336 includes a control transistor 380. Control transistor 380 is illustrated as a bipolar NPN transistor having a base connected to the voltage/current mode control output 382 of controller 330 via a fifth resistor 384. The collector of control transistor 380 is connected to a control junction 386. The emitter of control transistor 380 is connected to ground. The base of a junction transistor 388 is connected to control junction 386 via a forth resistor 381. The junction transistor is illustrated as a bipolar NPN transistor. The collector-emitter path of a junction transistor 388 is connected across the second voltage divider resistor 372 to short this resistor in a current regulator mode of operation.

Junction transistor 388 is a switch to short the second voltage divider resistor such that the voltage sense input 352 is selectively connected to ground. With the output voltage sense input 352 pulled to ground, the signal level on the current sense input 344 controls the pulse width of the signal on control output 350 of switch driver 332. In the voltage regulator mode, the second voltage divider resistor 372 is not shorted by the junction transistor 388. Accordingly, the feedback voltage level on voltage divider junction 375 is proportional to the voltage level at energy storage circuit output 305. This feedback voltage at output voltage sense input 352 will thus control the pulse width unless the current level detected at the current sense input 344 rises dramatically, such as can occur at power up.

The base of a selection transistor 389 is also connected to control junction 386 via a sixth resistor 390. The selection transistor 389 is illustrated as a bipolar transistor. The control junction 386 is also connected to the gate of a voltage regulator mode selection switch 392. The illustrated voltage regulator mode selection switch 392 is a MOSFET element. This switch connects the energy storage circuit output 305 to the voltage regulator mode output 219 in the voltage regulator mode. A seventh resistor 391 is connected to the gate and source of voltage regulator mode selection switch 392. The gate of a current regulator mode selection switch 394 is connected the collector of the selection transistor 389. The current regulator mode selection switch 394 is illustrated as a MOSFET element. The current regulator mode selection switch 394 connects energy storage circuit output 305 to the current regulator mode output 223 in the current regulator mode. A tenth resistor 399 is connected across the gate-source of the current regulator mode selection switch 394.

In the operation of output mode selection circuit 336, control transistor 380 controls the state thereof. When the voltage/current mode control output 382 is high to select the voltage regulation mode of operation, the base current to control transistor 380 places this transistor in a conducting state. Control transistor 380 thus pulls control junction 386 to ground in this mode. This pulls the base of junction transistor 388 and the selection transistor 389 to ground. Selection transistor 389 will not conduct, and tenth resistor 399 pulls the base of current regulator mode selection switch 394 to the level at output 305, thereby holding the current regulator mode selection switch 394 in a nonconducting state. With the control junction 386 at ground, a voltage exists across the gate-source of the voltage regulator mode selection switch 392, which holds the voltage regulator mode selection switch 392 in a conducting state. Accordingly, voltage regulator mode output 219 is the active output in the voltage regulator mode.

When the voltage/current mode control output 382 is low in the current regulator mode, control transistor 380 is nonconducting. The control junction 386 is thus pulled to the level of the energy storage circuit output 305 by seventh resistor 391. This causes voltage regulator mode selection switch 392 to be "OFF". The higher voltage at the control junction 386 causes a current to flow into the base of junction transistor 388 and the base of selection transistor 389, which biases these transistors into a conduction state. Junction transistor 388 thus pulls voltage divider junction 375 to ground, such that the current sense input 344 controls the pulse width of the control signal output to supply switch 348. When biased into a conduction state, selection transistor 389 pulls the gate of the voltage regulator mode selection switch 392 to ground, which creates a sufficient voltage across tenth resistor 399 to hold the current regulator mode selection switch 394 in a conducting state. This makes the voltage regulator mode output 219 the active output.

The output mode selection circuit 336 thus permits a single switching circuit to drive the voltage regulator and the current regulator, thereby eliminating one of the switching circuits utilized heretofore, and decreasing the size and cost of providing a current regulator and a voltage regulator in a device. Additionally, the voltage regulator mode selection switch 392 and the current regulator mode selection switch 394 of the output selection circuit isolate the voltage regulator mode output 219 and the current regulator mode output 223, thereby permitting different impedance loads to be connected to these outputs without harming circuit performance.

Power source selection circuit 338 includes a protection diode 393 connected between the current regulator mode selection switch 394 and current regulator mode output 223. Current regulator mode output 223 is connected to the terminal 217 of the internal power source 222, illustrated in FIG. 4 as a battery $B_{INT}$. Terminal 217 is also connected through the power source selection switch 395 to the power source output 303 for the switching circuit. The power source selection switch is illustrated as two MOSFET elements. However, the switch could be implemented using other suitable components which selectively isolate the internal and external power sources. An isolation diode 396 is connected between the power source output 303 and connector 224. An eighth resistor 397 is connected between the gates of the power source selection switch 395 and connector 224. A ninth resistor 398 is connected to the gates of the power source selection switch 395 to hold the two MOSFET elements therein at ground unless the voltage at the gate is pulled up by connecting connector 224 to an external power source 226, illustrated in FIG. 4 as a battery $B_{EXT}$. The ninth resistor 398 connected to ground holds the power source selection switch 395 in a conducting state when an external source is not connected to connector 224, such that the internal power source 222 is the power supply coupled to the power source output 303.

Controller 330 is implemented using any suitable commercially available microprocessor, or it is provided by the DSP 111 in FIG. 1. For example, a HC11 integrated circuit commercially available form Motorola, Inc. may be used to implement the DSP of FIG. 1 and controller 330.

A conductor 401 (FIG. 4) is connected between internal power source input 221 and an input of controller 330, and a conductor 402 is connected between connector 224 and another input of controller 330. The controller 330 senses the voltage level at these terminals, as well as an ambient temperature, and monitors the communication mode of the device. If the device is in a communication mode (i.e., a call processor generates a control signal when it is in an active call mode), the circuit operates in a voltage regulator mode to regulate the voltage supply to power amplifier 210. When an external battery is connected to connector 224, the processor detects the presence of an external voltage from the voltage level at this terminal, and identifies the presence of a supply voltage. If the device is not in a communication mode, and the external battery is present, the battery supply is thereafter regulated in accordance with any suitable, conventional charging algorithm as a function of temperature, battery voltage level, or the like.

Figure 6:
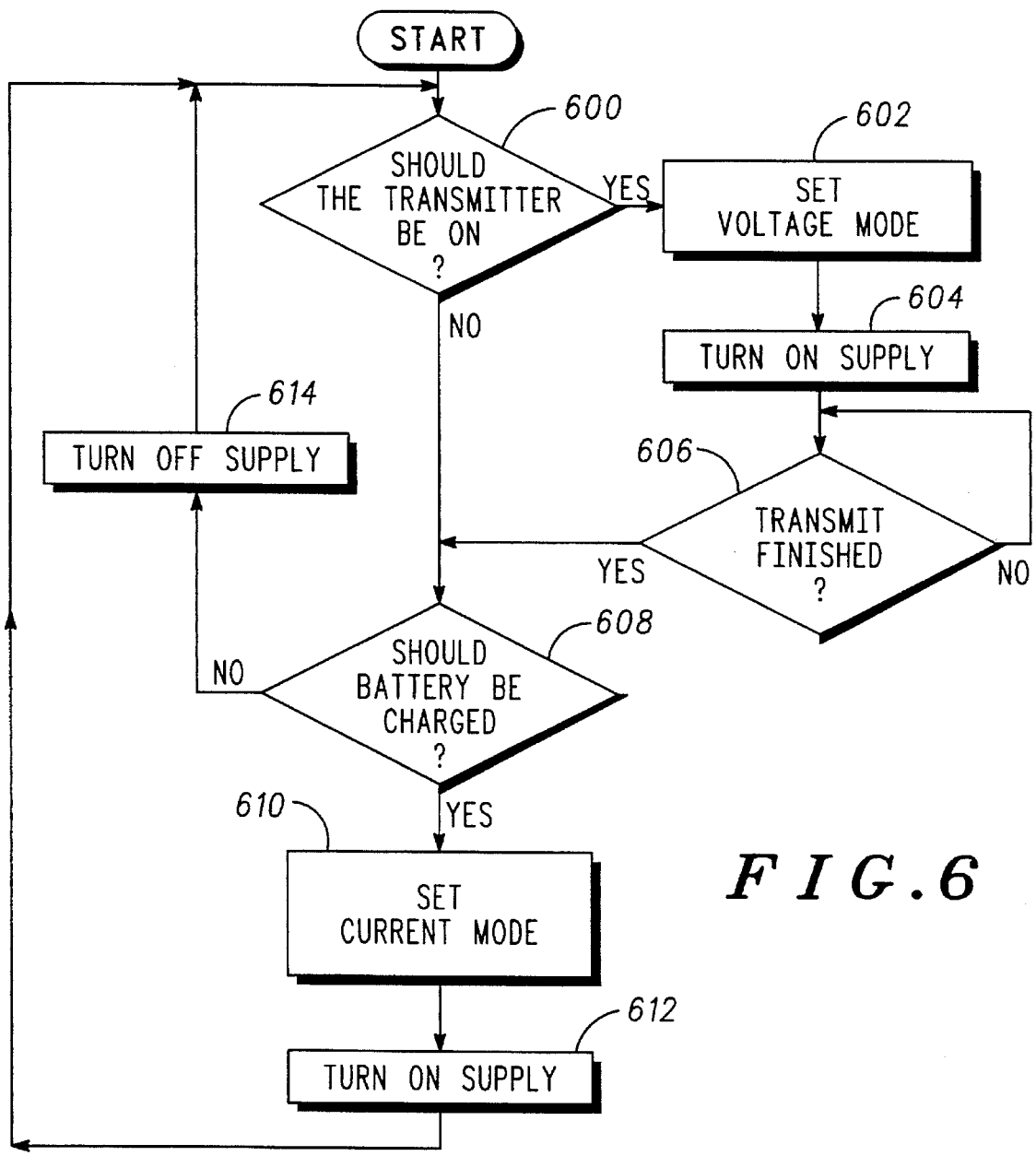
FIG. 6 is a flow chart illustrating a control program for the controller of FIG. 4.

In operation, controller 330 selects one of the voltage and current regulator modes of operation. Initially, the controller determines whether the transmitter 107 is "ON", as indicated in a decision block 600 (FIG. 6). The transmitter is "ON" when an RF signal is applied to the input of power amplifier 210. The controller can be in the transmitter on condition when the communication device is in an active call transmission state, which is an indication that an RF signal might be present at the input of power amplifier 210. In the transmitter on condition, controller 330 (FIG. 4) sets the switching circuit 345 to the voltage mode by the voltage/current mode control output 382 going to a high logic level and enabling the switch driver 332 via ON/OFF output 373, as indicated in block 602 (FIG. 6) and block 604. In this mode of operation, the voltage output is regulated to a predetermined characteristic, which is a constant voltage supplied to power amplifier 210, and the current will fluctuate while the voltage level is maintained. The controller 330 remains in the voltage regulator mode until the transmission is finished, as indicated in decision block 606.

After the transmission state is concluded, which is during a non-communication mode, the controller determines whether the battery is to be charged, as indicated in decision block 608. If the battery is to be charged, the controller 330 establishes a current regulator mode by placing the voltage/current mode control output 382 at a low logic level, as indicated in block 610. The switch driver 332 is enabled as indicated in block 612. In the current regulator mode, the current is regulated to a level according to a predetermined characteristic, which is a battery charging algorithm in the illustrated embodiment, and the voltage level is allowed to fluctuate while the current level is maintained.

If the controller determines that the battery is not to be charged in decision block 608, the switch driver 332 is disabled as indicated in block 614 and the controller returns to decision block 600. At the conclusion of battery charging, the controller returns to decision block 600. The controller will continue to cycle through the control decision blocks 600 and 608 until the battery is to be charged or the transmitter is to be on.

It is envisioned that the power regulator 220 (FIG. 2) would either provide a trickle current to the battery of the internal power source 222, or be disabled, if the battery does not require charging and the power amplifier 210 is not transmitting an RF signal. The battery of the internal power source will require charging when it is not fully charged, an external power source is connected to connector 224, and an RF signal is not being applied to power amplifier 210 (the device is not in a transmission communication mode). If the battery requires charging, the external power source is connected, and the device is not transmitting, the charging algorithm applies a fast charge current according to the charging algorithm. If these three conditions are not met, the internal power source is determined to not require charging. Those skilled in the art will recognize that a trickle charge can be applied from the external power source only when it is connected to connector 224.

With reference again to FIG. 4, in the voltage regulator mode of operation, supply switch 348 is closed, allowing current to flow from power source output 303 to inductor 360. Supply switch 348 remains in a conducting state until switch driver 332 detects that the voltage at voltage divider junction 375 reaches a predetermined level or the current at current sense input 344 reaches the limit set by the SOFT START input 377. Upon initialization, the current sense input will typically reach the current sense input level before the voltage at output voltage sense input $V_{OUT}$ reaches the internal voltage threshold level. However, after initial start-up, the voltage output level detected at input $V_{OUT}$ will control the pulse width of the signal at control output 350, and the switch driver will hold the energy storage circuit output 305 at a level that is substantially constant, in the voltage regulator mode.

In the current regulator mode, the switch driver 332 controls the current level at the energy storage circuit output 305 to have a desired regulated level. This signal level is set by the signal level at SOFT START input 377. In the current regulator mode, the feedback reference voltage at the $V_{OUT}$ input is set to a predetermined level by pulling this input to ground using junction transistor 388. This disables the voltage feedback control by holding the output voltage sense input 352 low, such that it will not exceed the internal fixed, threshold level, set in switch driver 332. The comparison of the level of the current sense input to the level of the SOFT START input 377 therefore controls the pulse width of the signal at control output 350. Accordingly, supply switch 348 is held conductive until the current sense input exceeds the SOFT START input. Supply switch 348 is then closed until the leading edge of the next pulse. This process is continued for each pulse in the sequence until the current mode ends.

It will be recognized that the VOLTAGE CONTROL output 374 of controller 330 sets the current threshold of switching circuit 345 in the current regulator mode. This output can therefor be used to vary the output current supplied to battery $B_{INT}$ during charging. The current can be varied according to a known charging algorithm stored in the controller memory (not shown). To implement this operation, a digital-to-analog (D/A) converter (not shown) is provided at the output of controller 330. The D/A converter may be provided by a conventional D/A converter discrete integrated circuit. Alternately, the D/A converter may be implemented by connecting a capacitor (not shown) to the voltage/current mode control output 382 and generating a variable pulse width signal at VOLTAGE CONTROL output 374 of controller 330. By selecting the appropriate pulse widths, the capacitor (not shown) will filter the output pulses to produce different DC signal levels at SOFT START input 377 representative of the desired current levels required for the battery charging algorithm.

It will also be recognized that the power amplifier 210 may be implemented using an LDMOS technology amplifier. LDMOS technology amplifiers present a substantially higher impedance to the supply rail than is presented by the battery $B_{INT}$. Accordingly, in the current regulation mode, current will flow to the battery $B_{INT}$ instead of the amplifier supply rail even if the voltage regulator mode selection switch 392 is omitted.

Those skilled in the art will recognize that the power regulator 220 can receive power from the internal power source 222 or the external power source 226 when it is operating in the voltage regulator mode to provide a controlled voltage to the power amplifier 210.

Thus it can be seen that a power regulator is disclosed that provides both current mode operation and voltage mode operation using a single switching circuit. By using a single switching circuit for both the voltage and current modes, both regulators are provided in a smaller circuit board surface area and at a lower cost. Additionally, the circuit uses one energy storage circuit, thereby reducing the number of inductors, which also reduces the surface area required to implement the current and voltage regulators.

What is claimed is:

1. A power regulator, comprising:
a power source circuit having a power source output, wherein the power source circuit includes a power source selection circuit to selectively couple the power source output to one of at least two power sources;
an energy storage circuit having an energy storage circuit input and an energy storage circuit output;
a controller including a mode control output; and
a switching circuit coupled to the power source output, the mode control output and to the energy storage circuit input, the switching circuit controlling an energy supply to the energy storage circuit such that a voltage level at the energy storage circuit output is substantially constant in a voltage regulator mode and a current level at the energy storage circuit output is controlled in a current regulator mode.

2. The power regulator as defined in claim 1, wherein the power source selection circuit includes a switch for connecting a battery to the power source output during the voltage regulator mode.

3. The power regulator as defined in claim 1, wherein the switching circuit includes a switch driver and a switch coupled to the switch driver, the switch driver being used for both the current regulator mode and the voltage regulator mode.

4. The power regulator as defined in claim 3, wherein the switch driver includes a current sense input and an output voltage sense input, wherein a signal level on the current sense input controls a pulse width of the switch driver in the current regulator mode and a signal level on the output voltage sense input controls the pulse width of the switch driver in the voltage regulator mode.

5. The power regulator as defined in claim 3, wherein the switch driver includes an output voltage sense input coupled to the energy storage circuit output and having a signal level proportional to a voltage level on the energy storage circuit output at least during the voltage regulator mode.

6. The power regulator as defined in claim 5, wherein the output voltage sense input has the voltage level proportional to the voltage level on the energy storage circuit output only when the switching circuit is in the voltage regulator mode.

7. A power regulator, comprising:
a power source circuit having a power source output;
an energy storage circuit having an energy storage circuit input and an energy storage circuit output;
a controller including a mode control output;
a switching circuit coupled to the power source output, the mode control output and to the energy storage circuit input, the switching circuit controlling an energy supply to the energy storage circuit such that a voltage level at the energy storage circuit output is substantially constant in a voltage regulator mode having voltage feedback control and a current level at the energy storage circuit output is controlled in a current regulator mode; and
an output mode selection circuit, wherein the output mode selection circuit includes a switch to disable voltage feedback control when the power regulator is in the current regulator mode.

8. A power regulator, comprising:
a power source circuit having a power source output;
an energy storage circuit having an energy storage circuit input and an energy storage circuit output;
a controller including a mode control output;
a switching circuit coupled to the power source output, the mode control output and to the energy storage circuit input, the switching circuit controlling an energy supply to the energy storage circuit such that a voltage level at the energy storage circuit output is substantially constant in a voltage regulator mode and a current level at the energy storage circuit output is controlled in a current regulator mode; and
an output mode selection circuit coupled to the switching circuit and the controller.

9. The power regulator as defined in claim 8, wherein the output mode selection circuit includes at least one switch for selectively connecting the energy storage circuit output to one of a voltage regulator mode output and a current regulator mode output.

10. The power regulator as defined in claim 9, wherein the at least one switch includes a voltage regulator mode selection switch and a current regulator mode selection switch, the voltage regulator mode selection switch connecting the energy storage circuit output to the voltage regulator mode output when the power regulator is operating in a voltage regulator mode and the current regulator mode selection switch connecting the energy storage circuit output to the current regulator mode output when the power regulator is in the current regulator mode.

11. A communication device, comprising:
a power amplifier for amplifying RF transmission signals;
an energy storage circuit having an energy storage circuit output coupled to the power amplifier and an energy storage circuit input;
a controller including a mode control output;
a power source circuit having a power source circuit output; and
a switching circuit coupled to the power source circuit output, the mode control output and to the energy storage circuit input, the switching circuit controlling an energy supply to the energy storage circuit such that a voltage level at the energy storage circuit output supplied to the power amplifier is substantially constant in a voltage regulator mode and a current level at the energy storage circuit output is controlled to be a desired level in a current regulator mode.

12. The communication device as defined in claim 11, wherein the power source circuit includes a power source selection circuit to selectively couple the power source circuit output to one of at least two power sources.

13. The communication device as defined in claim 12, wherein the power source selection circuit is coupled to an internal power source and a connector for coupling to an external power source.

14. The communication device as defined in claim 11, wherein the switching circuit includes a switch driver and a switch coupled to the switch driver, the switch driver being used for both the current regulator mode and the voltage regulator mode.

15. The communication device as defined in claim 14, wherein the switch driver includes a current sense input and an output voltage sense input, wherein a signal level on the current sense input controls a pulse width of the switch driver in the current regulator mode and a signal level on the output voltage sense input controls the pulse width of the switch driver in the voltage regulator mode.

16. The communication device as defined in claim 14, wherein the switch driver includes an output voltage sense input coupled to the energy storage circuit output and having a signal level proportional to a voltage level on the energy storage circuit output at least during the voltage regulator mode.

17. The communication device as defined in claim 16, wherein the voltage sense input has an input voltage level proportional to the voltage level on the energy storage circuit output only when the switching circuit is in the voltage regulator mode.

18. The communication device as defined in claim 16, further including an output mode selection circuit, wherein the output mode selection circuit further includes a switch to disable voltage feedback control when the switching circuit is in a current regulator mode.

19. The communication device as defined in claim 11 and including an output mode selection circuit coupled to the switching circuit and the controller.

20. The communication device as defined in claim 19, wherein the output mode selection circuit includes at least one switch for selectively connecting the energy storage circuit output to one of a voltage regulator mode output and a current regulator mode output.

21. The communication device as defined in claim 20, wherein the at least one switch includes a voltage regulator mode selection switch and a current regulator mode selection switch, the voltage regulator mode selection switch connecting the energy storage circuit output to the voltage regulator mode output when the switching circuit is operating in the voltage regulator mode and the current regulator mode selection switch connecting the energy storage circuit output to the current regulator mode output when the switching circuit is operating in the current regulator mode.

22. A radio telephone, comprising:

a battery;

a connector for connection to an external power source;

a power source selection circuit coupled to the connector and to the battery, the power source selection circuit for coupling one of the battery and the external power source to a power source output to supply energy to the power source output;

an energy storage circuit having an energy storage circuit output;

a controller having a mode control output;

a power amplifier;

an output mode selection circuit coupled to the power amplifier, the battery, and the controller, the output mode selection circuit responsive to the mode control output of the controller to selectively connect the energy storage circuit output to one of the battery and the power amplifier; and a switching circuit including a switch driver and a switch, the switching circuit coupled to the controller, the power source output, and the energy storage circuit, the switching circuit controlling energy supply to the energy storage circuit from the power source output such that the energy storage circuit output has a controlled current level supplied to the battery from the external power source for charging the battery in a current regulator mode and the energy storage circuit output has a controlled voltage level supplied to the power amplifier from the battery or the external power source in a voltage regulator mode.

23. A method of providing a regulated voltage and a regulated current in a communication device including a transmitter and a battery charged from an external power source, the communication device including a power regulator having a switching circuit and an output, the method comprising the steps of:

determining whether the transmitter should be on;

setting the switching circuit in a voltage regulator mode of operation if the transmitter should be on;

determining whether the battery should be charged; and setting the switching circuit in a current regulator mode of operation if the battery should be charged.

24. The method as defined in claim 23, further including the step of selecting one of the battery and an external power source as a power supply for the power regulator.

25. The method as defined in claim 24, wherein the method includes the steps of using a feedback voltage level to regulate an output voltage level in the voltage regulator mode and setting the feedback voltage level to a predetermined level in the current regulator mode.

26. The method as defined in claim 25, wherein the method further includes the step of disconnecting the output of the power regulator from a power amplifier in the transmitter in the current regulator mode.

27. A method of controlling a radio telephone including a power regulator having voltage and current regulator modes and a power amplifier coupled to an output of the power regulator, the radio telephone being coupled to a power source supplying voltage and current, the radio telephone having an active communication mode and a non-communication mode, the method comprising the steps of:

applying an RF signal to the power amplifier during the active communication mode;

controlling the power regulator to operate in the voltage regulator mode to produce a regulated voltage level to be supplied to the power amplifier while the RF signal is being applied to the power amplifier; and controlling the power regulator to operate in a current regulator mode to produce a regulated current level when the RF signal is not being applied to the power amplifier.

28. The method as defined in claim 27, wherein the step of controlling the power regulator to operate in the voltage regulator mode is performed when the radio telephone is in an active communication mode and the step of controlling the power regulator to operate in a current regulator mode is performed when the radio telephone is in the non-communication mode.

* * * * *